United States Patent
Raminosoa et al.

(10) Patent No.: US 9,673,667 B2
(45) Date of Patent: Jun. 6, 2017

(54) SYSTEM AND METHOD FOR PREVENTING STATOR PERMANENT MAGNET DEMAGNETIZATION DURING VACUUM PRESSURE IMPREGNATION

(71) Applicant: General Electric Company, Schenectady, NY (US)

(72) Inventors: Tsarafidy Raminosoa, Niskayuna, NY (US); James Pellegrino Alexander, Ballston Lake, NY (US); Ayman Mohamed Fawzi EL-Refaie, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 332 days.

(21) Appl. No.: 14/337,469

(22) Filed: Jul. 22, 2014

(65) Prior Publication Data
US 2016/0028276 A1    Jan. 28, 2016

(51) Int. Cl.
*H02K 3/30* (2006.01)
*H02K 1/17* (2006.01)
(Continued)

(52) U.S. Cl.
CPC ............ *H02K 1/17* (2013.01); *H02K 3/30* (2013.01); *H02K 15/03* (2013.01); *H02K 15/12* (2013.01); *H02K 21/38* (2013.01); *H02K 21/44* (2013.01)

(58) Field of Classification Search
CPC .. H02K 1/00; H02K 1/02; H02K 1/08; H02K 1/148; H02K 1/17; H02K 3/30;
(Continued)

(56) References Cited

U.S. PATENT DOCUMENTS 6,175,177 B1 * 1/2001 Sabinski ............. H02K 1/2773
310/156.55
6,849,981 B2   2/2005 Kojima et al.
(Continued)

FOREIGN PATENT DOCUMENTS

| CN | 201197099 Y | 2/2009 |
| CN | 201319552 Y | 9/2009 |
| JP | 2003244903 A | 8/2003 |

OTHER PUBLICATIONS

Wang et al., "Design and Develop of a MW Direct Drive High-speed Permanent-Magnet Machine for compression," 2013 International Conference on Electrical Machines and Systems (ICEMS), Busan, Korea, Oct. 26-29, 2013, pp. 892-895.
(Continued)

*Primary Examiner* — Tran Nguyen
(74) *Attorney, Agent, or Firm* — Meagher Emanuel Laks Goldberg & Liao, LLP (57) ABSTRACT

A permanent magnet electrical machine includes a stator having conductive windings wound thereon and one or more permanent magnets embedded in the stator. A magnetic keeper element is positioned on the stator so as to form a magnetic flux path with the permanent magnets, with the magnetic keeper element closing the magnetic flux path of the permanent magnets by providing a low reluctance flux path to magnetic flux generated by the permanent magnets. A vacuum pressure impregnation (VPI) process is performed on the stator to increase a thermal conductivity of the windings, with the VPI process including a curing step that is performed at a selected temperature. The magnetic keeper element sets an operating point of the permanent magnets to an internal flux density level above a demagnetization threshold associated with the selected temperature at which the curing step is performed.

21 Claims, 9 Drawing Sheets

(51) Int. Cl.
  *H02K 21/44* (2006.01)
  *H02K 15/03* (2006.01)
  *H02K 15/12* (2006.01)
  *H02K 21/38* (2006.01)

(58) Field of Classification Search
  CPC ........ H02K 15/03; H02K 15/12; H02K 21/00;
        H02K 21/04; H02K 21/38; H02K 21/44
  USPC .................. 310/181, 154.34, 154.48–154.49
  See application file for complete search history.

(56) References Cited

U.S. PATENT DOCUMENTS

| | | | |
|---|---|---|---|
| 7,573,168 B2 | 8/2009 | Carl, Jr. et al. | |
| 7,843,100 B2 | 11/2010 | Blissenbach et al. | |
| 7,898,135 B2* | 3/2011 | Flynn | H02K 19/103 310/152 |
| 2003/0201681 A1* | 10/2003 | Shimizu | B62D 5/0403 310/51 |
| 2005/0046191 A1 | 3/2005 | Cole et al. | |
| 2007/0227470 A1 | 10/2007 | Cole et al. | |
| 2008/0185932 A1* | 8/2008 | Jajtic | H02K 1/148 310/181 |
| 2013/0113318 A1 | 5/2013 | Nishiyama | |
| 2013/0257190 A1 | 10/2013 | Hamer et al. | |
| 2014/0021819 A1* | 1/2014 | Hong | H02K 1/2786 310/156.22 |
| 2014/0028139 A1 | 1/2014 | Hamer et al. | |

OTHER PUBLICATIONS

Jung et al., "Optimum Design for Eddy Current Reduction in Permanent Magnet to Prevent Irreversible Demagnetization," Proceeding of International Conference on Electrical Machines and Systems (ICEMS), Seoul, Korea, Oct. 8-11, 2007, pp. 949-954.

European Search Report and Opinion issued in connection with corresponding EP Application No. 15177470.0 on Feb. 5, 2016.

* cited by examiner

SYSTEM AND METHOD FOR PREVENTING STATOR PERMANENT MAGNET DEMAGNETIZATION DURING VACUUM PRESSURE IMPREGNATION

GOVERNMENT LICENSE RIGHTS

This invention was made with Government support under contract number DE-EE0005573 awarded by the United States Department of Energy. The Government has certain rights in the invention.

BACKGROUND OF THE INVENTION

The invention relates generally to stator permanent magnet electrical machines and, more particularly, to a system and method for setting the operating point of permanent magnets of stator permanent magnet machines so as to avoid demagnetization of the magnets during a high temperature Vacuum Pressure Impregnation (VPI) process.

The usage of electrical machines in various industries has continued to become more prevalent in numerous industrial, commercial, and transportation industries over time. In manufacturing such electrical machines, a process known as Vacuum Pressure Impregnation (VPI) is an essential process for the windings of the electrical machine, as the VPI process improves the dielectric strength of the insulation on the windings as well as the winding thermal conductivity. The VPI process fills any voids or porosity in the winding with a high thermal conductivity varnish. In this way, the VPI prevents the apparition of air pockets and provides a thermally conductive contact between the copper wires, slot liners and the laminations. Hence, the VPI process significantly improves the thermal performance of the electrical machine and is therefore key in enhancing its life and reliability.

It is known that, in performing a VPI process, a high temperature cure of 150 C (or higher) is typically employed. In many types of conventional electrical machines, no special precautions need to be taken during the VPI process, as there is no special adverse effect of the high temperature cure. However, for some types of electrical machines—specifically for electrical machines that are designed to have permanent magnets positioned on the stator (i.e., "stator permanent magnet machines"—including permanent magnet flux switching machines, permanent magnet flux reversal machines, and doubly-salient permanent magnet machines, for example), the high temperature cure employed by the VPI process may expose the permanent magnets on the stator to a demagnetization risk if no special precaution is taken to ensure the load line of the permanent magnets are above the demagnetization knee for the cure temperature. This risk of demagnetization is further increased when the permanent magnets in the machine are in the form of low cost, low thermal stability magnet grades—such as Dysprosium-free or Reduced Dysprosium permanent magnets. That is, for the same temperature, the demagnetization knee occurs at higher internal flux density levels in Dysprosium-free or reduced Dysprosium Neodymium magnets as compared to their conventional Neodymium counterparts, which makes the demagnetization risk more serious in these low cost but low thermal stability reduced rare earth magnets.

Therefore, it would be desirable to provide a system and method for setting the operating point of permanent magnets of stator permanent magnet machines so as to avoid demagnetization of the magnets during a high temperature VPI process.

BRIEF DESCRIPTION OF THE INVENTION

In accordance with one aspect of the invention, a method for fabricating a permanent magnet electrical machine includes providing a stator that includes conductive windings wound thereon and one or more permanent magnets embedded in the stator, and positioning a magnetic keeper element on the stator so as to form a magnetic flux path with the one or more permanent magnets, with the magnetic keeper element closing the magnetic flux path of the one or more permanent magnets by providing a low reluctance flux path to magnetic flux generated by the one or more permanent magnets. The method also includes performing a vacuum pressure impregnation (VPI) process on the stator to increase a thermal conductivity of the conductive windings, with the VPI process including a curing step that is performed at a selected temperature. The magnetic keeper element sets an operating point of the one or more permanent magnets to an internal flux density level above a demagnetization threshold associated with the selected temperature at which the curing step is performed.

In accordance with another aspect of the invention, a permanent magnet electrical machine includes a stator having a plurality of teeth with conductive windings wound thereabout and one or more permanent magnets embedded in the stator. The permanent magnet electrical machine also includes a magnetic keeper element positioned on the stator so as to form a magnetic flux path with the one or more permanent magnets, with the magnetic keeper element closing the magnetic flux path of the one or more permanent magnets by providing a low reluctance flux path to magnetic flux generated by the one or more permanent magnets. The magnetic keeper element includes a removable element that is selectively attachable and detachable to the stator, such that the magnetic keeper element may be added prior to performing of a vacuum pressure impregnation (VPI) process on the stator and may be removed upon completion of the VPI process on the stator.

In accordance with yet another aspect of the invention, a stator assembly for a permanent magnet electrical machine is formed by the steps of providing a stator that includes conductive windings wound thereon and one or more permanent magnets embedded in the stator, positioning a magnetic keeper element on the stator to form a closed magnetic flux path with the one or more permanent magnets, and performing a vacuum pressure impregnation (VPI) process on the stator to increase a thermal conductivity of the conductive windings, the VPI process including a curing step that is performed at a selected temperature. The magnetic keeper element sets an operating point of the one or more permanent magnets to an internal flux density level above a demagnetization threshold associated with the selected temperature at which the curing step is performed.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a system and method for setting the operating point of permanent magnets of stator permanent magnet machines so as to avoid demagnetization of the magnets during a high temperature VPI process. A magnetic keeper element is positioned on the stator during the VPI process, with the magnetic keeper element serving to close the magnetic flux of the permanent magnets through a low reluctance path so as to allow for the operating points of the permanent magnets to be set to an internal flux density level above a demagnetization threshold.

Embodiments of the invention are useable with a number of stator permanent magnet machine topologies where the permanent magnets and windings are located in the stator instead of the conventional rotor permanent magnet topology, including permanent magnet flux switching machines, flux reversal machines, and doubly-salient permanent magnet machines. Accordingly, while only a single machine topology may be illustrated in the figures discussed below, it is to be understood that embodiments of the invention are not limited to this one machine topology, and that other stator permanent magnet machine topologies are considered to be within the scope of the invention.

Figure 1:
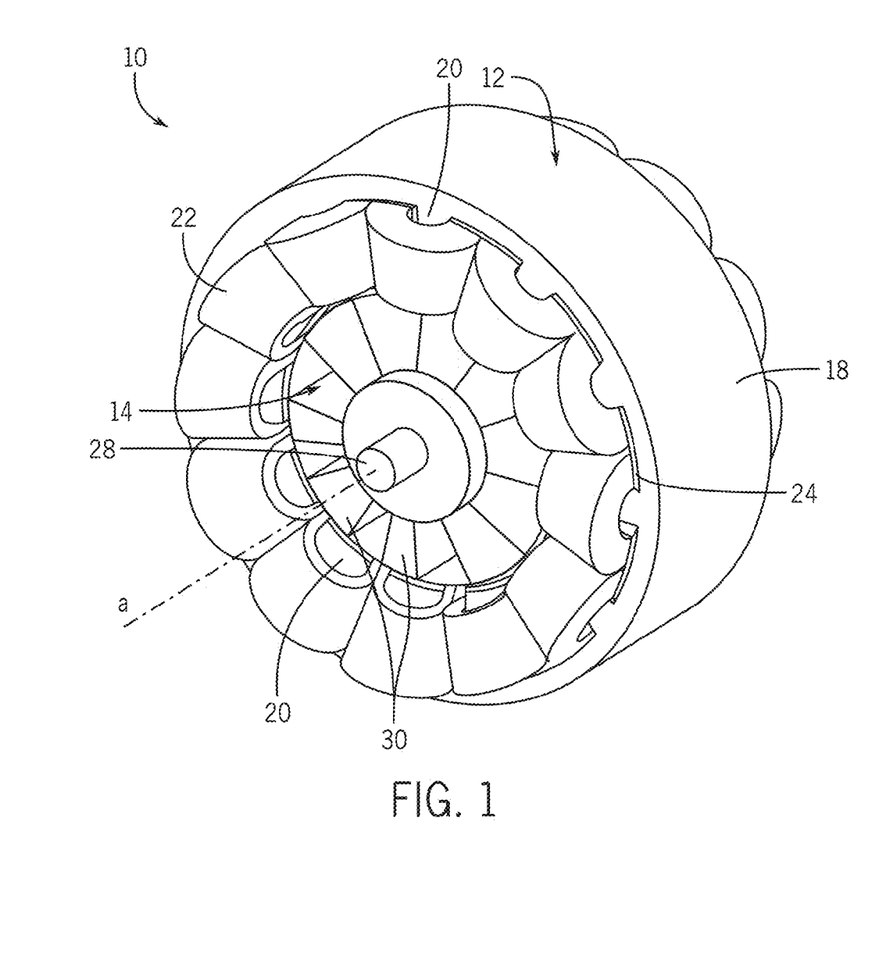
FIG. 1 is a schematic perspective view of an overall permanent magnet electrical machine in accordance with an embodiment of the invention.
Figure 2:
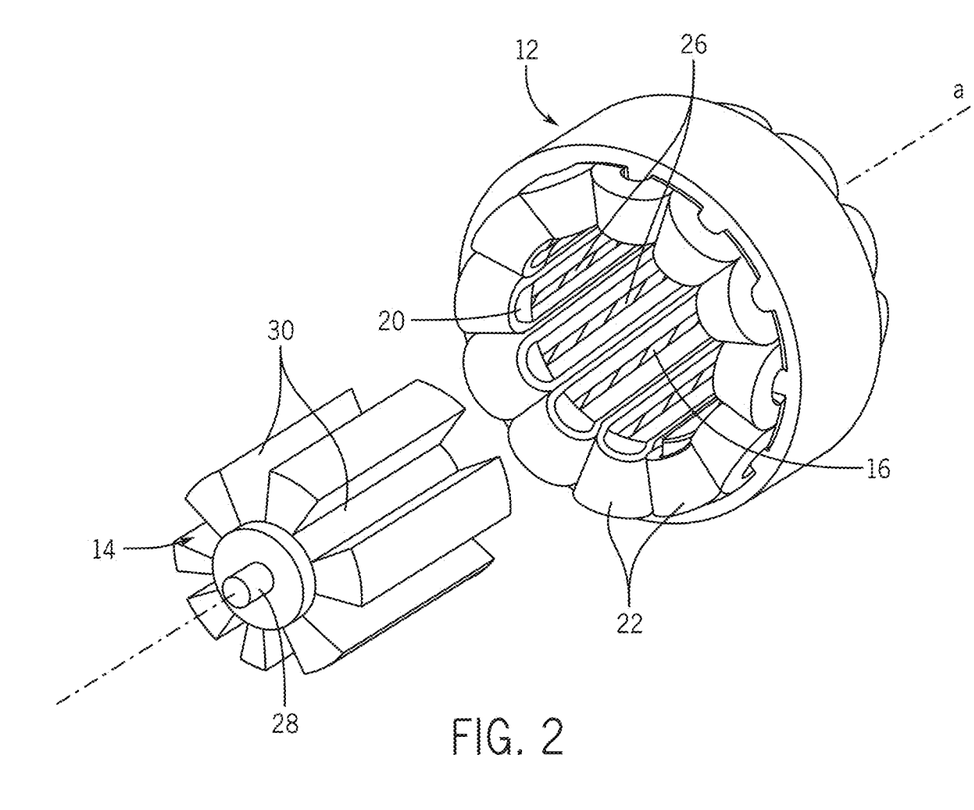
FIG. 2 is a schematic perspective view of a stator of the electrical machine of FIG. 1.

Referring to FIGS. 1 and 2, therein are shown views of a portion of a stator permanent magnet machine 10 (such as an electric motor or generator) with and in which embodiments of the invention may be utilized. The stator permanent magnet machine 10 can include a substantially concentrically disposed stator 12 and rotor 14. For example, the stator 12 can define a stator bore 16 within which the rotor 14 can be disposed. The stator bore 16 and the rotor 14 may be substantially cylindrical, and may be elongated so as to define an axis α. The rotor 14 can be coupled to a shaft 28 that is configured to rotate about the axis a.

The stator section may include an outer yoke 18 (sometimes referred to as the "back iron"), and one or more teeth 20 each extending, say, radially inward from the outer yoke. Conductive windings 22 can be wound around respective teeth 20. Insulation 24 can be included so as to provide electrical isolation between the outer casing 18/teeth 20 and the conductive windings 22. The stator 12 also includes one or more permanent magnets 26 that are embedded in the stator (i.e., either in the teeth 20 or in the yoke 18), with the magnets being magnetized such that the magnetization polarities of the magnets alternate circumferentially around the stator 12. According to one embodiment, the permanent magnets 26 are formed as Dysprosium-free or reduced Dysprosium permanent magnets—such as Dysprosium-free Neodymium permanent magnets. Such Dysprosium-free or reduced Dysprosium permanent magnets are "low cost" magnets that dramatically reduce the material cost of the stator permanent magnet machine 10—although with the tradeoff of the permanent magnets 26 having low thermal stability (as compared to magnets with higher levels of Dysprosium therein), as will be discussed in further detail below.

During operation of the stator permanent magnet machine 10, the shaft 28 and rotor 14 rotate about the axis α. Depending on whether the stator permanent magnet machine 10 is a generator or a motor, electric current in the conductive windings 22, interacting with magnetic fields associated with the magnets 26, will either be induced by or cause rotation of the rotor 14. In the former case, work done on the shaft 28 can induce rotation of the shaft and rotor 14 and current flow in the windings 22, while in the latter, current injected into the windings can cause rotation of the rotor and shaft as the rotor attempts to bring the rotor teeth 30 positioned thereon to a position of minimum reluctance with respect to the stator teeth 20.

Regarding the stator 12 shown in FIGS. 1 and 2, the stator 12 is not formed as a single, solid machined piece, but instead is comprised of a plurality of stator laminations 32 that are stacked axially and pressed to form the stator. Each of the laminations 32 is formed of a material that can be stamped or cut, for example, to form the metallic laminations.

In fabricating the stator permanent magnet machine 10, a Vacuum Pressure Impregnation (VPI) process is performed to improve the thermal conductivity of the windings 22 and increase the dielectric strength of the insulation 24. In performing the VPI process, any voids or porosity in the windings 22 are filled with a high thermal conductivity varnish that is subsequently subjected to a high temperature cure (i.e., cure of 150° C. or higher, such as 180° C.) so as to prevent the apparition of air pockets, thereby providing a thermally conductive contact between the copper wires of the windings 22, slot liner insulation 24 and the laminations 32. The VPI process significantly improves the thermal performance of the electrical machine 10 and is therefore key in enhancing its life and reliability.

With regard to the high temperature cure employed by the VPI process, it is recognized herein that the cure may expose the permanent magnets 26 on the stator 12 to a demagnetization risk—especially in an embodiment where the permanent magnets 26 are provided as Dysprosium-free or reduced Dysprosium permanent magnets, as such magnets have a reduced thermal stability. That is, if no special precaution is taken to ensure the load line of the permanent magnets 26 are above the demagnetization knee for the cure temperature, the permanent magnets 26 may be subjected to a demagnetization risk.

Figure 3:
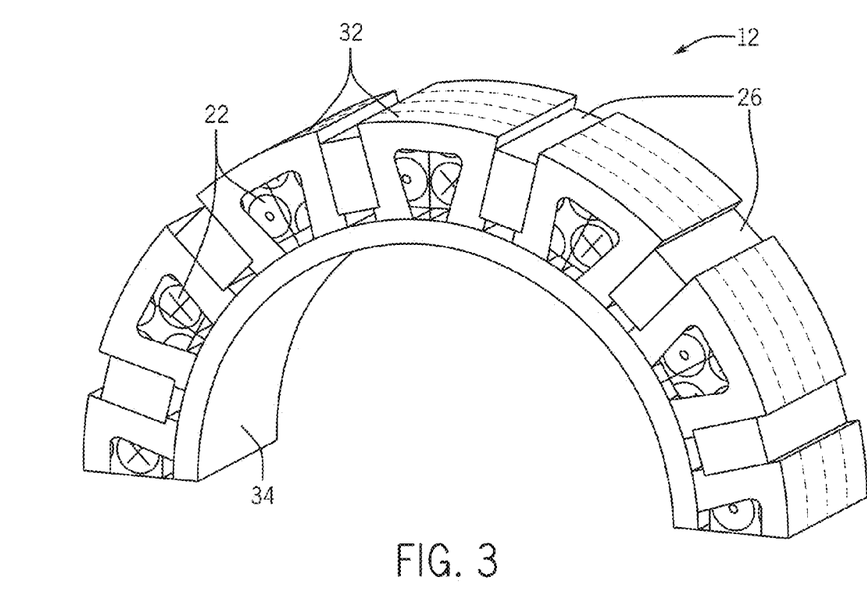
FIG. 3 is a schematic perspective view of a stator for the electrical machine of FIG. 1, with the stator including a magnetic keeper element positioned thereon for performing of a VPI process, according to an embodiment of the invention.

In order to address the risk of demagnetization of the permanent magnets 26 occurring during the VPI process, embodiments of the invention provide an apparatus and method to set the operating point of the permanent magnets 26 so as to avoid demagnetization during the high temperature VPI process. Referring now to FIG. 3, the stator 12 of the stator permanent magnet machine 10 is illustrated as it is fabricated prior to and during the VPI process. As can be seen in FIG. 3, prior to and during the VPI process, a magnetic keeper element 34 is positioned on the stator 12 that functions to set the operating point of the permanent magnets 26 so as to avoid demagnetization of the permanent magnets 26 during the VPI process. According to an exemplary embodiment, the magnetic keeper element 34 is formed as a ring-shaped element (i.e., a magnetic keeper ring) that is positioned along the inner circumference of the stator 12. It is recognized, however, that the magnetic keeper element 34 may be formed to have a shape/construction other than a ring-shaped element—including the magnetic keeper element 34 being formed of multiple pieces that may be joined together when positioned on the stator 12.

The magnetic keeper element 34 is provided as a removable element that is selectively attachable and detachable to the stator 12. More specifically, the magnetic keeper element 34 would be added prior to performing of a vacuum pressure impregnation (VPI) process on the stator 12 and would be removed upon completion of the VPI process on the stator 12. Upon removal of the magnetic keeper element 34, fabrication of the stator permanent magnet machine 10 could continue with positioning of the rotor 14 relative to the stator 12.

The magnetic keeper element 34 is formed of a soft magnetic material having a magnetic permeability significantly larger than the magnetic permeability of air (i.e., relative magnetic permeability of 100 to 1,000 for the magnetic keeper). The magnetic keeper element 34 formed from a soft magnetic material serves to close the magnetic flux path of the permanent magnets 26—generally indicated by 36—by providing a low reluctance flux path to the flux generated by the permanent magnets 26. That is, without the magnetic keeper 34, the magnet flux would close through the air surrounding the machine 10, and the permanent magnets 26 would see a high reluctance flux path that lowers their internal flux density. By providing a low reluctance flux path 36 to the flux generated by the permanent magnets 26, the magnetic keeper element 34 allows for the operating points of the permanent magnets 26 to be set to an internal flux density level above the demagnetization threshold (i.e., "demagnetization knee") at the cure temperature of the VPI process—which would not be the case if the magnet flux were to close through the air surrounding the machine.

Figure 4:
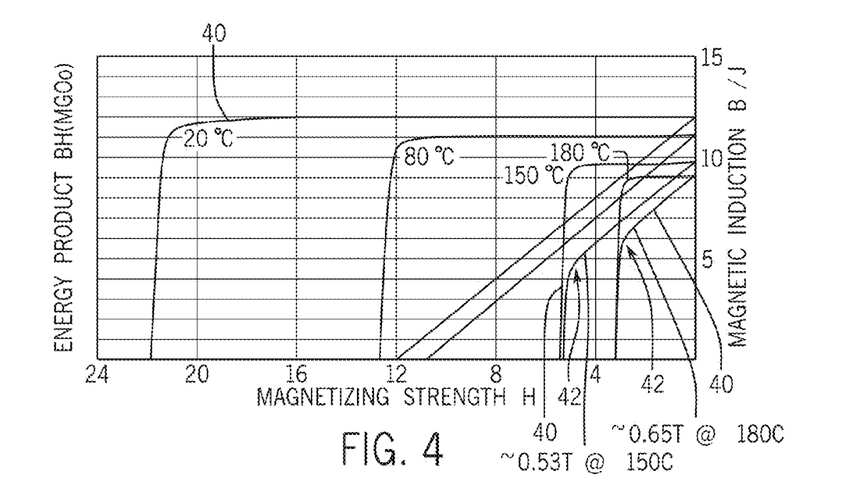
FIG. 4 is a graph illustrating a set of BH-curves for a Dysprosium-free permanent magnet at various temperatures, including a demagnetization knee on each curve.

The setting/maintaining of the internal flux density level of the permanent magnets 26 above the demagnetization threshold (i.e., a "demagnetization knee") via the magnetic keeper element 34 is illustrated in FIG. 4, which shows a typical set of BH-curves 40 of a Dysprosium-free permanent magnet at various temperatures. The "demagnetization knee"—indicated at 42—for each curve 40 is the point where the recoil line starts bending, and the operating point of the permanent magnets 26 has to stay above the demagnetization knee 42 at any time in order to prevent a permanent reduction in magnetization. As can be seen in FIG. 4, the demagnetization knee 42 increases with temperature, with the demagnetization knee for a curing temperature of 150° C. being at 0.53 Tesla and the demagnetization knee for a curing temperature of 180° C. being at 0.65 Tesla, for example.

Figure 5:
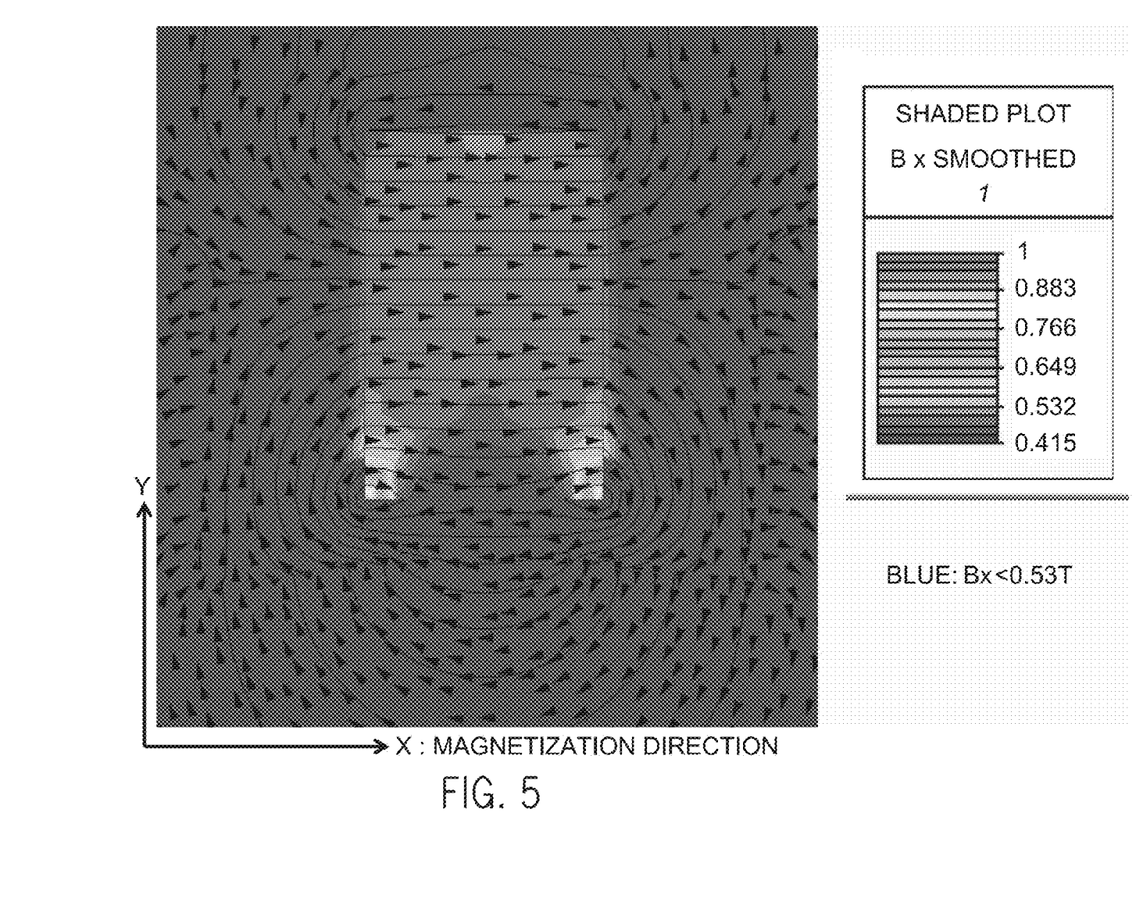
FIG. 5 is a graph illustrating the flux density component along the magnetization direction for a permanent magnet undergoing a VPI process with a curing temperature of 150° C., without use of a magnetic keeper element.
Figure 6:
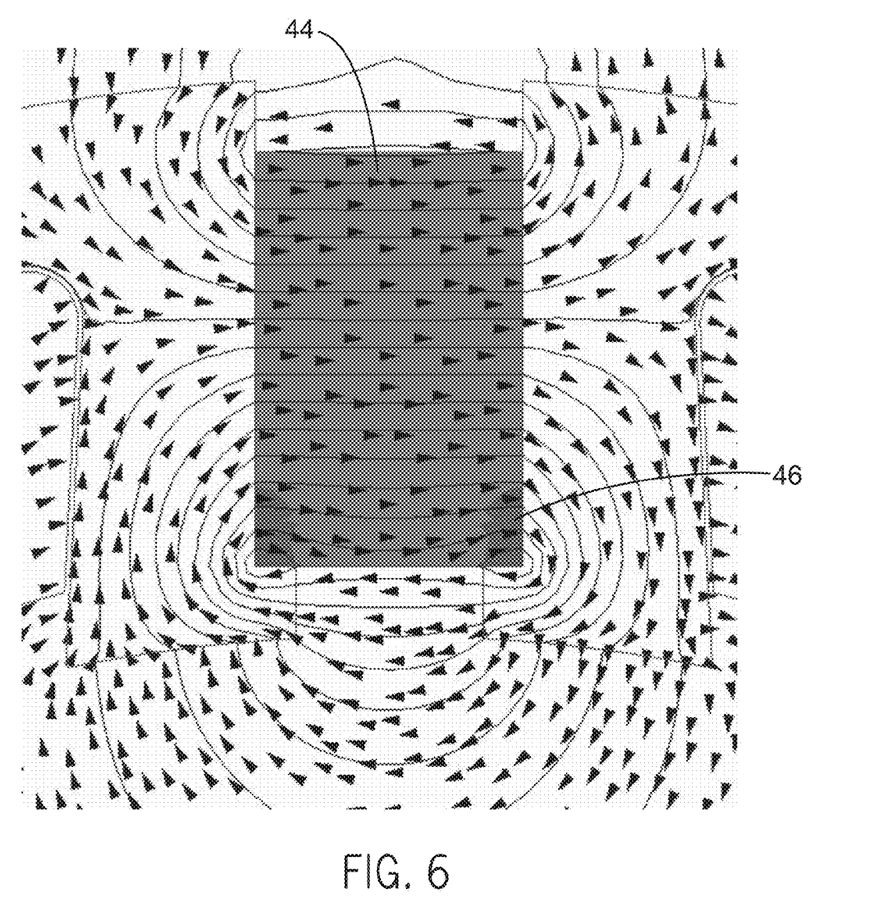
FIG. 6 is a demagnetization chart for the permanent magnet of FIG. 5.

Referring now to FIGS. 5-10, and with continued reference back to FIGS. 1-3, a comparison of the demagnetization experienced by permanent magnets 26 (e.g., Dysprosium-free Neodymium permanent magnets) during a VPI curing process with and without use of a magnetic keeper element 34 are provided, with maps of the flux density component along the magnetization direction and demagnetization charts being shown. Referring first to FIGS. 5 and 6, the demagnetization experienced by the permanent magnets 26 during a VPI curing process is illustrated for the performing of the cure without the use of a magnetic keeper element 34. In FIG. 5, a map of the flux density component along the magnetization direction (i.e., x-axis) for a permanent magnet during a VPI cure performed at a temperature of 150° C. is shown. As previously indicated above, the demagnetization knee for a curing temperature of 150° C. is at 0.53 Tesla, and it is shown in FIG. 5 that areas of a permanent magnet 26 (i.e., most of the permanent magnet area) exhibit an internal flux density below the demagnetization knee of 0.53 Tesla, showing a significant risk of demagnetization during the VPI process if no precaution is taken. This is confirmed by the demagnetization map of FIG. 6, which illustrates that a majority of the permanent magnet 26 is in a demagnetized condition or state (i.e., the strength of the flux is below 0.53 Tesla)—indicated at 44—during a 150C VPI cure without use of a magnetic keeper element 34, with only a small area remaining in a magnetize condition/state—indicated at 46.

Figure 7:
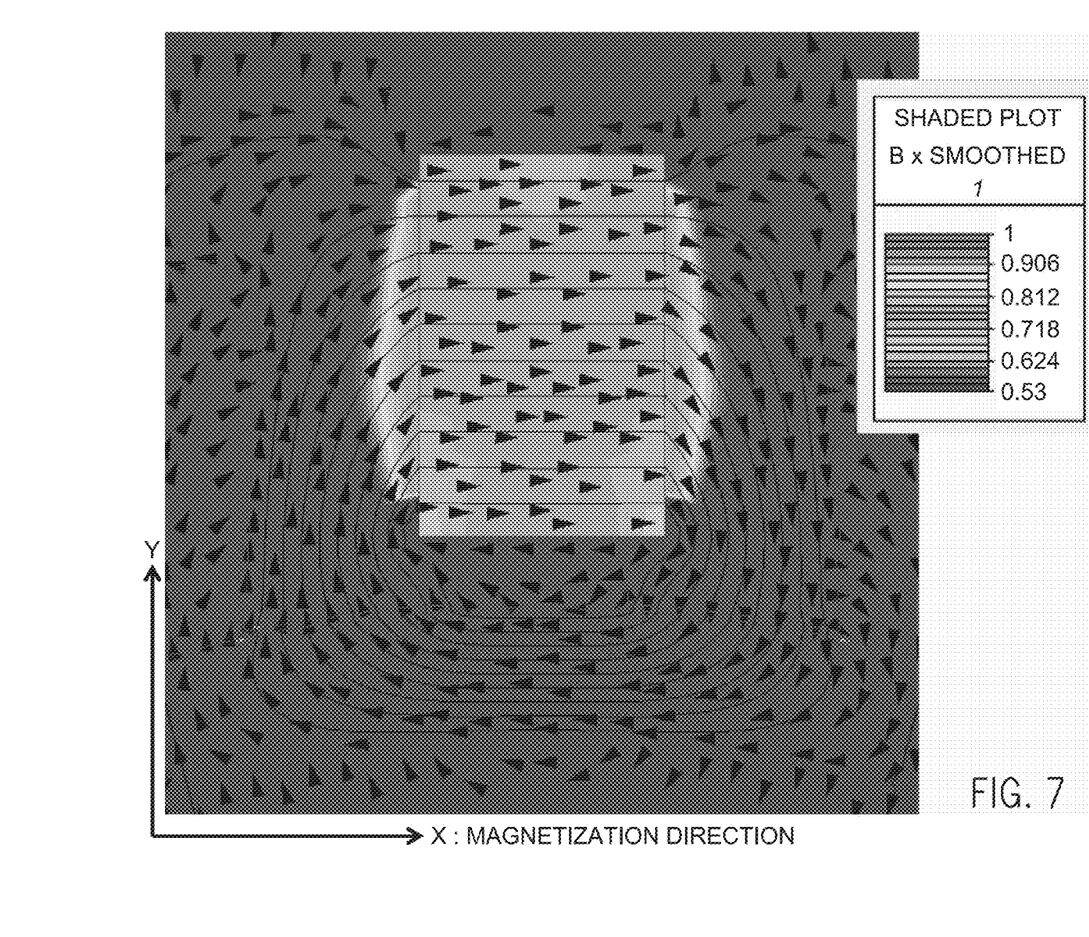
FIG. 7 is a graph illustrating the flux density component along the magnetization direction for a permanent magnet undergoing a VPI process with a curing temperature of 150° C., with use of a magnetic keeper element.
Figure 8:
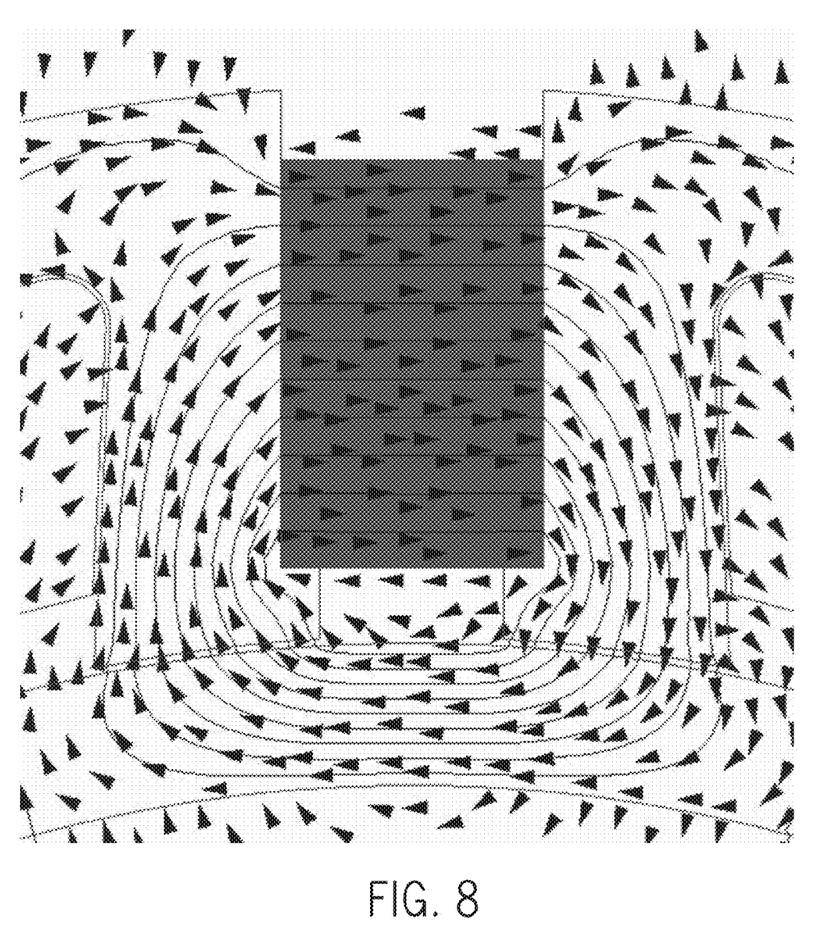
FIG. 8 is a demagnetization chart for the permanent magnet of FIG. 7.

Referring now to FIGS. 7 and 8, the demagnetization experienced by the permanent magnets 26 during a VPI curing process is illustrated for the performing of the cure with the use of a magnetic keeper element 34. In FIG. 7, a map of the flux density component along the magnetization direction (i.e., x-axis) for a permanent magnet 26 during a VPI cure performed at a temperature of 150° C. is shown. As can be seen in FIG. 7, the magnet flux mostly closes through the lowest reluctance path formed by the magnetic keeper 34 under it. As previously indicated above, the demagnetization knee for a curing temperature of 150° C. is at 0.53 Tesla, and it can be further seen in FIG. 7 that there are no areas on the permanent magnet 26 that exhibit a flux density below the demagnetization knee of 0.53 Tesla—with the internal flux density in fact being significantly above the 0.53 T threshold over the whole permanent magnet area. The demagnetization map of FIG. 8 illustrates that no areas of the permanent magnet 26 have entered into a demagnetized condition or state (i.e., the strength of the flux is below 0.53 Tesla), such that it can be confirmed that the demagnetization risk is effectively removed by the introduction of the magnetic keeper element 34.

Figure 9:
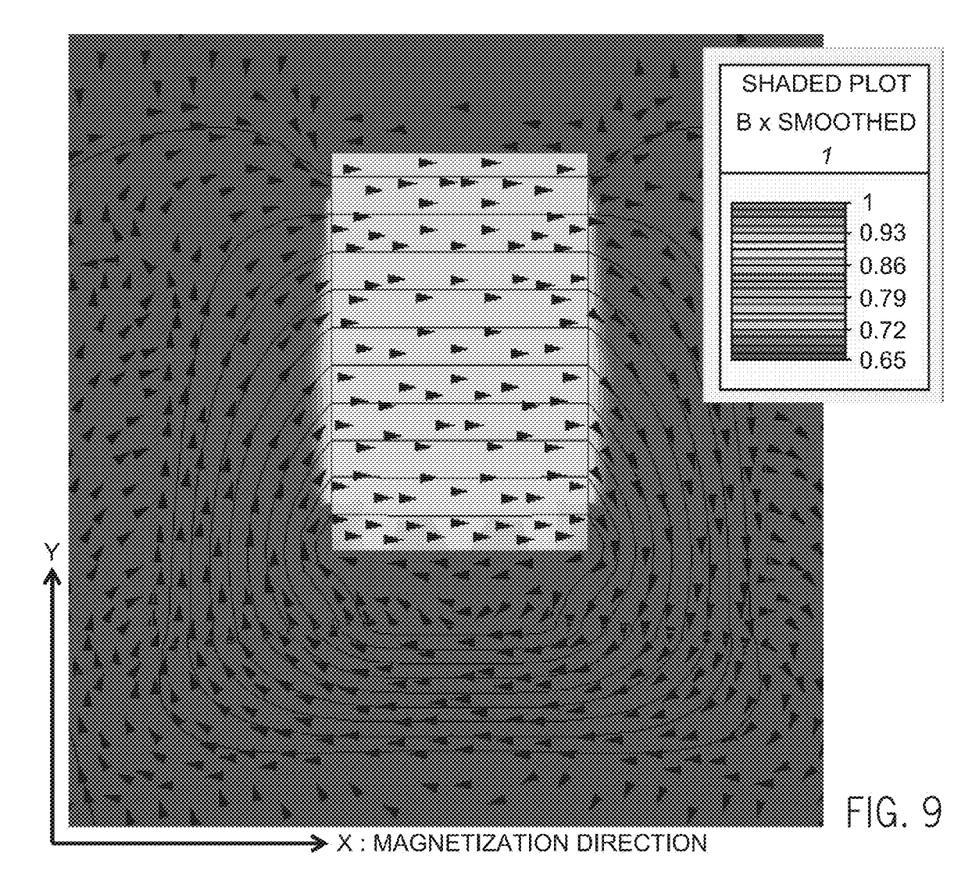
FIG. 9 is a graph illustrating the flux density component along the magnetization direction for a permanent magnet undergoing a VPI process with a curing temperature of 180° C., with use of a magnetic keeper element.
Figure 10:
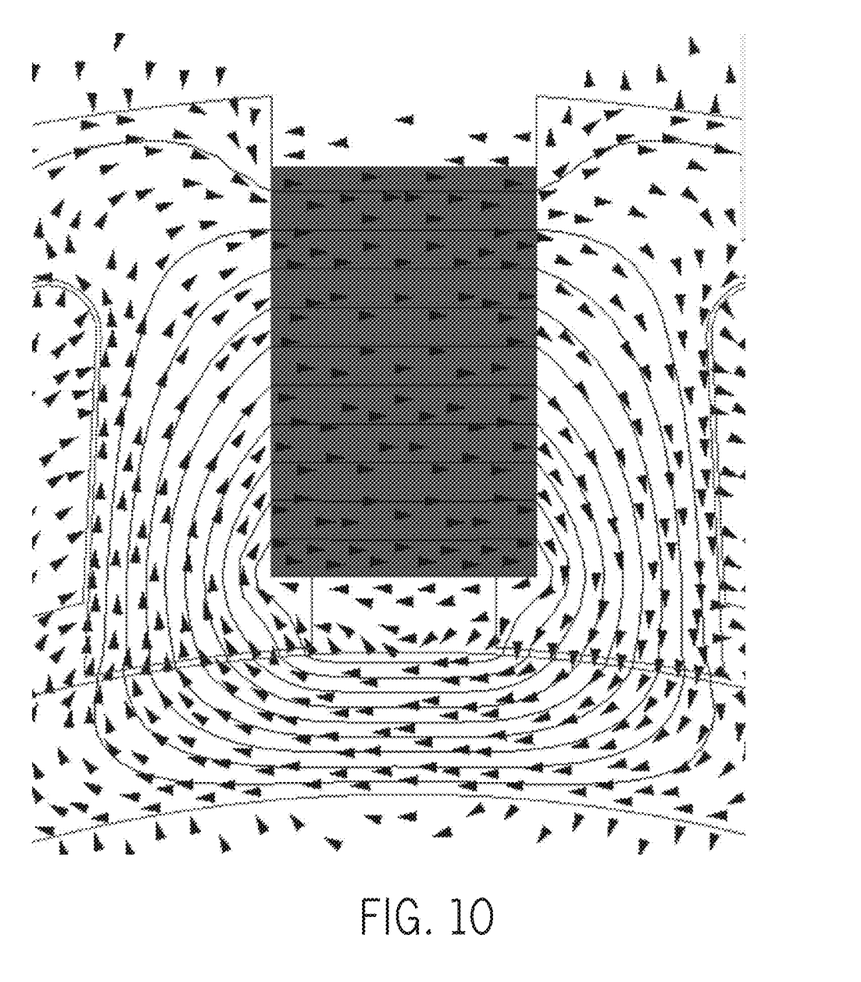
FIG. 10 is a demagnetization chart for the permanent magnet of FIG. 9.

Referring now to FIGS. 9 and 10, the demagnetization experienced by the permanent magnets 26 during a VPI curing process is illustrated for the performing of the cure with the use of a magnetic keeper element 34—with the curing process this time being performed at a temperature of 180° C. As previously indicated above, the demagnetization knee for a curing temperature of 180° C. is at 0.65 Tesla, and it is shown in the map of the flux density component along the magnetization direction (i.e., x-axis) of FIG. 9 that there are no areas on the permanent magnet 26 that exhibit a flux density below the demagnetization knee of 0.65 Tesla. Accordingly, the demagnetization map of FIG. 10 illustrates that no areas of the permanent magnet 26 have entered into a demagnetized condition or state (i.e., the strength of the flux is below 0.65 Tesla).

Beneficially, embodiments of the invention thus provide a system and method for setting the operating point of permanent magnets of stator permanent magnet machines so as to avoid demagnetization of the magnets during a high temperature VPI process. A magnetic keeper element is positioned on the stator for performing of the VPI process, with the magnetic keeper element serving to close the magnetic flux path of the permanent magnet through a low reluctance path so that the operating points of the permanent magnets are set to an internal flux density level above the demagnetization threshold at the VPI operating temperature. Use of the magnetic keeper element thus helps with the manufacturability of electrical machines having permanent magnets in their stator by allowing high temperature VPI without risk of demagnetization. The magnetic keeper element also makes possible the use of Dysprosium-free or Reduced Dysprosium permanent magnets in stator permanent magnet machines by removing the risk of demagnetization during the VPI process in spite of their low thermal stability, with the use of such low cost Dysprosium-free or Reduced Dysprosium permanent magnets thus dramatically reducing material cost and improving the marketability of some emerging permanent magnet electrical machines having the permanent magnets in their stators.

Therefore, according to one embodiment of the invention, a method for fabricating a permanent magnet electrical machine includes providing a stator that includes conductive windings wound thereon and one or more permanent magnets embedded in the stator, and positioning a magnetic keeper element on the stator so as to form a magnetic flux path with the one or more permanent magnets, with the magnetic keeper element closing the magnetic flux path of the one or more permanent magnets by providing a low reluctance flux path to magnetic flux generated by the one or more permanent magnets. The method also includes performing a vacuum pressure impregnation (VPI) process on the stator to increase a thermal conductivity of the conductive windings, with the VPI process including a curing step that is performed at a selected temperature. The magnetic keeper element sets an operating point of the one or more permanent magnets to an internal flux density level above a demagnetization threshold associated with the selected temperature at which the curing step is performed.

According to another embodiment of the invention, a permanent magnet electrical machine includes a stator having a plurality of teeth with conductive windings wound thereabout and one or more permanent magnets embedded in the stator. The permanent magnet electrical machine also includes a magnetic keeper element positioned on the stator so as to form a magnetic flux path with the one or more permanent magnets, with the magnetic keeper element closing the magnetic flux path of the one or more permanent magnets by providing a low reluctance flux path to magnetic flux generated by the one or more permanent magnets. The magnetic keeper element includes a removable element that is selectively attachable and detachable to the stator, such that the magnetic keeper element may be added prior to performing of a vacuum pressure impregnation (VPI) process on the stator and may be removed upon completion of the VPI process on the stator.

According to yet another embodiment of the invention, a stator assembly for a permanent magnet electrical machine is formed by the steps of providing a stator that includes conductive windings wound thereon and one or more permanent magnets embedded in the stator, positioning a magnetic keeper element on the stator to form a closed magnetic flux path with the one or more permanent magnets, and performing a vacuum pressure impregnation (VPI) process on the stator to increase a thermal conductivity of the conductive windings, the VPI process including a curing step that is performed at a selected temperature. The magnetic keeper element sets an operating point of the one or more permanent magnets to an internal flux density level above a demagnetization threshold associated with the selected temperature at which the curing step is performed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for fabricating a permanent magnet electrical machine, the method comprising:
   providing a stator that includes conductive windings wound thereon and one or more permanent magnets embedded in the stator;
   positioning a magnetic keeper element on the stator so as to form a magnetic flux path with the one or more permanent magnets, with the magnetic keeper element closing the magnetic flux path of the one or more permanent magnets by providing a low reluctance flux path to magnetic flux generated by the one or more permanent magnets; and
   performing a vacuum pressure impregnation (VPI) process on the stator to increase a thermal conductivity of the conductive windings, the VPI process including a curing step that is performed at a selected temperature;
   wherein the magnetic keeper element sets an operating point of the one or more permanent magnets to an internal flux density level above a demagnetization threshold associated with the selected temperature at which the curing step is performed.

2. The method of claim 1 wherein the magnetic keeper element is positioned along an inner circumference of the stator.

3. The method of claim 2 wherein the magnetic keeper element comprises a magnetic ring positioned along the inner circumference of the stator.

4. The method of claim 1 wherein the magnetic keeper element is formed of a soft magnetic material.

5. The method of claim 4 wherein the soft magnetic material has a relative magnetic permeability of 100 to 1,000.

6. The method of claim 1 wherein a demagnetization knee of a BH-curve associated with the VPI process is dependent on material from which the one or more permanent magnets is formed and the selected curing temperature.

7. The method of claim 1 wherein the one or more permanent magnets comprise Dysprosium-free or reduced Dysprosium permanent magnets.

8. The method of claim 1 further comprising removing the magnetic keeper element upon completion of the VPI process.

9. A permanent magnet electrical machine comprising:
a stator having a plurality of teeth with conductive windings wound thereabout and one or more permanent magnets embedded in the stator;
a removable magnetic keeper element, selectively attachable and detachable to the stator, the removable magnetic keeper element positioned along an inner circumference of the stator so as to form a magnetic flux path with the one or more permanent magnets, with the magnetic keeper element closing the magnetic flux path of the one or more permanent magnets by providing a reluctance flux path to magnetic flux generated by the one or more permanent magnets.

10. The permanent magnet electrical machine of claim 9 wherein the magnetic keeper element comprises a magnetic ring.

11. The permanent magnet electrical machine of claim 9 wherein the one or more permanent magnets comprise Dysprosium-free or reduced Dysprosium permanent magnets.

12. The permanent magnet electrical machine of claim 9 wherein the magnetic keeper element sets an operating point of the one or more permanent magnets to an internal flux density level above a demagnetization threshold.

13. The permanent magnet electrical machine of claim 9 wherein the magnetic keeper element is formed of a soft magnetic material having a relative magnetic permeability of 100 to 1,000.

14. A stator assembly for a permanent magnet electrical machine, the stator assembly being formed by the steps of:
providing a stator that includes conductive windings wound thereon and one or more permanent magnets embedded in the stator;
positioning a magnetic keeper element on the stator to form a closed magnetic flux path with the one or more permanent magnets; and
performing a vacuum pressure impregnation (VPI) process on the stator to increase a thermal conductivity of the conductive windings, the VPI process including a curing step that is performed at a selected temperature;
wherein the magnetic keeper element sets an operating point of the one or more permanent magnets to an internal flux density level above a demagnetization threshold associated with the selected temperature at which the curing step is performed.

15. The stator assembly of claim 14 wherein the magnetic keeper element is formed of a soft magnetic material having a relative magnetic permeability of 100 to 1,000.

16. The stator assembly of claim 14 wherein the demagnetization threshold comprises a demagnetization knee of a BH-curve associated with the VPI process for the one or more permanent magnets.

17. The stator assembly of claim 16 wherein the demagnetization knee of the BH-curve is dependent on material from which the one or more permanent magnets is formed and the selected curing temperature.

18. The stator assembly of claim 17 wherein the one or more permanent magnets comprise Dysprosium-free or reduced Dysprosium permanent magnets.

19. The stator assembly of claim 14 wherein the magnetic keeper element is removed upon completion of the VPI process.

20. The permanent magnet electrical machine of claim 9 wherein the magnetic keeper element is selectively attachable prior to performing a vacuum pressure impregnation (VPI) process on the stator.

21. The permanent magnet electrical machine of claim 9 wherein the magnetic keeper element is selectively removable after completing a vacuum pressure impregnation (VPI) process on the stator.

* * * * *